(12) United States Patent
Roberts et al.

(10) Patent No.: US 8,500,266 B2
(45) Date of Patent: Aug. 6, 2013

(54) AB BLOCK COPOLYMER DISPERSANTS HAVING AN INK VEHICLE SOLUBLE BLOCK

(75) Inventors: C. Chad Roberts, Hockessin, DE (US); Robert Paul Held, Newark, DE (US); Patrick F. McIntyre, West Chester, PA (US); Christian Jackson, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 278 days.

(21) Appl. No.: 13/125,599

(22) PCT Filed: Nov. 20, 2009

(86) PCT No.: PCT/US2009/065330
§ 371 (c)(1),
(2), (4) Date: Apr. 22, 2011

(87) PCT Pub. No.: WO2010/059939
PCT Pub. Date: May 27, 2010

(65) Prior Publication Data
US 2011/0199420 A1    Aug. 18, 2011

Related U.S. Application Data

(60) Provisional application No. 61/116,360, filed on Nov. 20, 2008.

(51) Int. Cl.
*G01D 11/00* (2006.01)

(52) U.S. Cl.
USPC .......................................................... 347/100

(58) Field of Classification Search
USPC ............................. 347/100; 524/533, 502, 439
See application file for complete search history.

(56) References Cited

U.S. PATENT DOCUMENTS

| | | | |
|---|---|---|---|
| 4,490,728 A | 12/1984 | Vaught et al. | |
| 5,085,698 A | 2/1992 | Ma et al. | |
| 5,519,085 A * | 5/1996 | Ma et al. | 524/503 |
| 5,852,075 A | 12/1998 | Held | |
| 5,859,113 A * | 1/1999 | McIntyre et al. | 524/460 |
| 6,051,645 A | 4/2000 | Suzuki et al. | |
| 6,161,918 A | 12/2000 | Bailey et al. | |
| 6,648,463 B2 | 11/2003 | Koga et al. | |
| 2004/0048973 A1 | 3/2004 | Akutsu et al. | |
| 2005/0090599 A1 | 4/2005 | Spinelli | |

FOREIGN PATENT DOCUMENTS

| | | |
|---|---|---|
| EP | 1 167 470 A1 | 1/2002 |
| WO | 2006/138311 A1 | 12/2006 |

OTHER PUBLICATIONS

Wojciech Zeslawski, Authorized Officer, Written Opinion of the International Searching Authority, in WO 2010/059939, PCT/US2009/065330, PCT counterpart of the present application, European Patent Office, Munich DE, May 20, 2011.

Gabriele Feldmann, Authorized Officer, Written Opinion of the International Searching Authority, in WO 2008/082552, PCT/US2007/025920, PCT counterpart of copending U.S. Appl. No. 11/643,169, European Patent Office, Munich DE, Jun. 21, 2009.

* cited by examiner

*Primary Examiner* — Jason Uhlenhake
(74) *Attorney, Agent, or Firm* — Simon L. Xu; John H. Lamming

(57) ABSTRACT

The present disclosure provides a aqueous colorant dispersion comprising a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure: $CH_2=CRC(O)O(CHR_1CH_2O)nR_2$, wherein R and $R_1$ are H, or methyl; $R_2$ is alkyl of 1-4 carbon atoms or phenyl; and n is about 1 to about 20; and the B block is a segment comprising an ionic monomer and at least one hydrophobic monomer; and wherein the dispersant is neutralized. The disclosure further pertains to an aqueous ink jet ink comprising this aqueous colorant dispersion. Still further, the disclosure pertains to a method of printing that provides images with the requisite optical density and chroma needed for emerging ink jet applications.

25 Claims, No Drawings

AB BLOCK COPOLYMER DISPERSANTS HAVING AN INK VEHICLE SOLUBLE BLOCK

BACKGROUND OF THE DISCLOSURE

This disclosure relates to novel, stable aqueous pigment dispersions, the polymeric dispersants that produce the stable aqueous pigment dispersions, the process of making the pigment dispersions and the use thereof in ink jet inks. These dispersants enable a unique combination of ionic and steric stabilization. In water, they provide only ionic stabilization with a random ionic block, but with addition of ink vehicle components, these dispersants facilitate entropic repulsion and steric stabilization with an ink vehicle soluble block.

Aqueous dispersions of pigments are known in the art and have been used in various applications such as, for example, inks for printing (particularly ink jet printing); waterborne paints and other coating formulations for vehicles, buildings, road markings and the like; cosmetics; pharmaceutical preparations; etc. Because pigments are typically not soluble in an aqueous ink vehicle, it is often required to use dispersing agents, such as polymeric dispersants or surfactants, to produce a stable dispersion of the pigment in the ink vehicle.

An application of the present disclosure relates to an ink (printing liquid) useful for writing utensils such as aqueous ball point pens, fountain pens and felt-tip pens; continuous and on-demand type inkjet printers of a thermal jet type, a piezo type and the like; and an inkjet printing method employing the ink.

Aqueous pigment dispersions generally are stabilized by either a non-ionic or ionic technique. When the non-ionic technique is used, a polymer having a non-ionic hydrophilic section that extends into the water medium is typically employed. The hydrophilic section provides entropic or steric stabilization that stabilizes the pigment particles in the aqueous ink vehicle. Polyvinyl alcohol, cellulosics, ethylene oxide modified phenols and ethylene oxide/propylene oxide polymers may be used for this purpose.

While the non-ionic technique is not sensitive to pH changes or ionic contamination, it has a major disadvantage in that the printed image is water sensitive. Thus, non-ionic content should be minimized to ensure durability.

In the ionic technique, the pigment particles are stabilized using the polymer of an ion containing monomer, such as neutralized acrylic, maleic or vinyl sulfonic acid. The polymer provides stabilization through a charged double layer mechanism whereby ionic repulsion hinders the particles from flocculation. Since the neutralizing component tends to evaporate after printing, the polymer then has reduced water solubility and the printed image is not water sensitive.

There continues to be a need for higher-quality and different property inks for inkjet ink applications. For instance, photographic and other highly colored printing requires improved inkjet inks. Although improvements in polymeric dispersants have significantly contributed to improved inkjet inks, the current dispersants still do not provide inks with requisite optical density and chroma needed for emerging ink jet applications.

SUMMARY OF THE DISCLOSURE

In a first aspect, the disclosure provides an aqueous colorant dispersion comprising a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

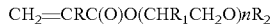

wherein R and $R_1$ are H, or methyl;
$R_2$ is alkyl of 1-4 carbon atoms or phenyl; and
n is about 1 to about 20, more typically about 1 to about 10; and the B block is a segment comprising an ionic monomer and at least one hydrophobic monomer; and wherein the dispersant is neutralized. More typically the A block segment comprises about 60 to about 100% of the monomer having the specified formula, still more typically about 70 to about 95%, and most typically about 80 to about 95% of said monomer.

In the first aspect, the polymeric dispersant comprises an A block having a block size of about 5 to about 18 units, more typically about 6 to about 16 units, and most typically about 8 to about 12 units, and a B block having a block size of about 15 to about 80 units, and more typically 25 to about 70 units, and a number average Molecular Weight (Mn) in the range of between about 2000 to about 20000 Daltons, more typically about 4000 to about 12000 Daltons.

In a second aspect, the disclosure provides an aqueous ink jet ink comprising an ink vehicle and an aqueous colorant dispersion, wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

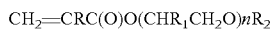

wherein R and $R_1$ are H, or methyl;
$R_2$ is alkyl of 1-4 carbon atoms or phenyl; and
n is about 1 to about 20, more typically about 1 to about 10; and the B block is a segment comprising an ionic monomer and at least one hydrophobic monomer; and wherein the dispersant is neutralized. More typically the A block is free of hydroxyethylmethacrylate.

In a third aspect, the disclosure provides a method of ink jet printing onto a substrate comprising, in any workable order, the steps of:

(a) providing an ink jet printer that is responsive to digital data signals;

(b) loading the printer with a substrate to be printed;

(c) loading the printer with an aqueous ink jet ink comprising an ink vehicle and an aqueous colorant dispersion, wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

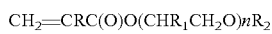

wherein R and $R_1$ are H, or methyl;
$R_2$ is alkyl of 1-4 carbon atoms or phenyl; and
n is about 1 to about 20, more typically about 1 to about 10; and the B block is a segment comprising an ionic monomer and at least one hydrophobic monomer; and wherein the dispersant is neutralized, and (d) printing onto the substrate using the aqueous ink jet ink, in response to the digital data signals to form a printed image on the substrate.

DETAILED DESCRIPTION OF THE PREFERRED EMBODIMENTS

The aqueous colorant dispersions of this disclosure comprise a colorant and a polymeric dispersant. Further the inks comprise an ink vehicle and the aqueous colorant dispersions. These inks provide images with the requisite optical density and chroma needed for emerging ink jet applications.

Aqueous Colorant Dispersions

Polymeric Dispersant:

The polymeric dispersant is an AB block copolymer that has reduced ionic character producing substantially only ionic stabilization in water. However, in the ink vehicle, the A block extends out leading to entropic repulsion/steric stabilization. These block copolymers may comprise an A block that is soluble in the ink vehicle components such as glycols and butyl carbitol, and a B block comprising a random segment of ionic/potentially ionic and hydrophobic monomers. By 'potentially ionic' it is meant a monomer which may be neutralized to become ionic such as methacrylic acid (MAA). MAA may be neutralized with KOH to become an ionic monomer unit. The number of units in the A block is about 5 to about 18, more typically about 6 to about 12, still more typically about 8 to about 12, and most typically about 8 units. The number of units in the B block is about 15 units to about 80 units, more typically about 25 units to about 70 units and most typically about 30 units to about 50 units. The B block provides ionic stabilization whereas the A provides steric stabilization in the ink vehicle. With a design goal of substantially no steric stabilization in water and minimal ionic content, these dispersants provide excellent image properties (O.D. and durability) while facilitating robust ink formulations and pragmatic dispersion processes.

The hydrophobic nature of the polymeric dispersants is important in that it can attach to the pigment surface, most likely via van der Waals, dipole-dipole, π-stacking and similar non-bonding forces (physical adsorption to the pigment). The major difference between the polymeric dispersants of this disclosure and known systems is the presence of a distinct ink vehicle soluble block along with a random block of hydrophobic and ionic monomers wherein the ionic portion is significantly reduced.

Furthermore, the hydrophobic and ionic segments of the polymers may be distributed in the polymer to minimize large molecular regions of ionic components. These high densities of ionic groups can lead to undesirable electro-steric stabilization. Thus, the dispersants of this disclosure provide only ionic stabilization in water with added steric stabilization in the presence of the ink vehicle. The extent of steric stabilization is dependent on the solubility parameter of the ink vehicle and the ink vehicle soluble block of the dispersant.

The print properties of the inks are especially enhanced in the presence of metal salts, and examples include Calcium Carbonate/Chloride treated papers (ColorLok) and underprinting with salt latent inks (magnesium nitrate cyan inks).

Pigments are insoluble in the ink vehicle and must be treated in order to form a stable dispersion. The pigments are stabilized to dispersion in the aqueous ink vehicle by a block copolymer dispersant having two blocks (or segments), an A block and a B block. The A block, is an ink vehicle soluble segment of the polymer which provides minimal steric stabilization in the ink vehicle while also enhancing the surface-activity of the dispersant. The B block is a random segment comprising ionic/potentially-ionic monomers and hydrophobic monomers providing pigment anchoring. The overall polymeric dispersant has a number average molecular weight (Mn) of about 2,000 to about 20,000 Daultons, more typically about 4,000 to about 12,000 Daultons, and an acid number of about 40 to about 220 (mg KOH/g polymer solids) more typically about 50 to about 150 (mg KOH/g polymer solids). The weight ratio of pigment to dispersion (P/D) is typically between about 0.5 and 5.

A Block Composition:

The function of the A Block is to provide steric stabilization in the ink vehicle leading to stability of the dispersion in the presence of organic components which may be in the ink vehicle also known as the aqueous carrier medium. Organic components often contribute to flocculation of aqueous pigment dispersions. When the A block of an AB diblock dispersant has good solubility in the organic components, resistance to flocculation can be markedly improved through the extension of the A block out from the pigment surface in the ink vehicle leading to entropic repulsion/steric stabilization. Furthermore, typical A block monomers are non-ionic, hydrophilic and increase surface-activity of the dispersant.

The constituent monomer(s) of the A block may be hydrophilic or hydrophobic depending on the properties of the organic components, and they may include monomers which are constituents of the B block. However, hydroxyl functional monomer units, such as 2-hydroxyethyl methacrylate (HEMA), typically lead to significant hydrogen bonding which influences sustainability of jetting (Decap and pen storage) and redispersability of ink. Structural similarity between the A block and the organic components in the ink vehicle will generally result in good compatibility and steric stabilization.

The A block is a segment substantially free of hydroxyethylmethacrylate, and more typically free of hydroxyethylmethacrylate, and comprises at least 50% by weight of a monomer, having the following structure:

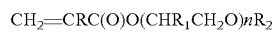

wherein R and $R_1$ are H, or methyl;

$R_2$ is alkyl of 1-4 carbon atoms or phenyl; and n is about 1 to about 20, more typically about 1 to about 10.

Depending on the number, n, of oxyethylene units, the polymers can be just hydrophilic but water insoluble to completely water soluble. The solubility of the polymer increases as the number of oxyethylene units increases. Typical monomers for the A block are ethoxy triethylene glycol methacrylate, n-butoxyethyl methacrylate and mixtures thereof. The A block may also function to improve polymer properties even in the absence of organic cosolvents It has been found that n-butoxyethyl methacrylate has good compatibility with butyl cellosolve or butyl carbitol, and ethoxy triethylene glycol methacrylate has good compatibility with glycols such as ethylene glycol, diethylene glycol, and tripropylene glycol. In addition, propoxylated methacrylates are soluble in propylene glycols whereas poly(ethoxytriethylene glycol) methacrylate has good compatibility with poly(ethylene oxide) as well as water.

The A block may also contain minor amounts of other monomers, less than 50% by weight, that may be similar to constituents of block B. Examples of other monomers that may be incorporated in block A include methyl methacrylate, methacrylic acid, butyl methacrylate, and 2-dimethylaminoethyl methacrylate. These monomers can be advantageously used in the A block to adjust the physical properties, e.g., Tg, of the polymeric dispersant of this disclosure while maintaining the compatibility with an aqueous dispersion system. However, by the nature of this invention, the A block should have minimal interaction with the pigment, and thus, strongly anchoring monomer units, such as styrene, substituted styrene benzyl methacrylate, phenoxyethyl acrylate, are not desired.

B Block Composition:

The B block of the AB block dispersant is comprised of ionic/potentially ionic monomers and hydrophobic monomers. The ratio of the ionic/potentially ionic monomers and hydrophobic monomer is about 15 to about 80, more typically about 25 to about 70, and most typically about 30 to about 50. The hydrophobicity of the B block in the AB block copolymer dispersants is derived from the hydrophobic monomer, $R_3R_4C=R_5X$ wherein each of $R_3$-$R_5$ are independently selected from the group consisting of H and an alkyl, aryl or alkylaryl group having 1-20 carbons, and wherein X is described below. In one preferred embodiment, each of $R_3$-$R_5$ is selected from the group consisting of H and $CH_3$. In another preferred embodiment, $R_3$ and $R_4$ is H, and $R_5$ is independently selected from H and $CH_3$.

In a typical embodiment, X is selected from the group consisting of:

(a) an alkyl, aryl and alkylaryl group containing 1-20 carbon atoms, which group may further contain one or more heteroatoms;

(b) a group of the formula $C(O)OR_6$, wherein $R_6$ is selected from the group consisting of an alkyl, aryl and alkylaryl group containing 1-20 carbon atoms, which group may further contain one or more heteroatoms; and (c) a group of the formula $C(O)NR_7R_8$, wherein each of $R_7$ and $R_8$ is independently selected from the group consisting of H and an alkyl, aryl and alkylaryl group containing 1-20 carbon atoms, which group may further contain one or more heteroatoms.

Typical hydrophobic monomers in general include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl ethacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, acrylonitrile, glycidyl acrylate, p-tolyl acrylate, sorbyl acrylate, styrene, alpha-methyl styrene, substituted styrenes, N-alkyl acrylamides, N-alkyl methacrylamides, vinyl acetate, vinyl butyrate and vinyl benzoate.

The ionic character of the AB polymer dispersants is derived from the ionic monomer, $R_9R_{10}C=R_{11}Z$ wherein each of $R_9$-$R_{11}$ are independently selected from the group consisting of H and an alkyl, aryl or alkylaryl group having 1-20 carbons, and wherein Z, ionic or a potentially ionic moiety, is described below. In one preferred embodiment, each of $R_9$-$R_{11}$ is selected from the group consisting of H and $CH_3$. In another preferred embodiment, $R_9$ and $R_{10}$ is H, and $R_{11}$ is independently selected from H and $CH_3$.

The Z group can be anionic, cationic, amphoteric or zwitterionic. Some examples of the Z group include anionic groups selected from the group consisting of sulfonates, sulfate, sulfosuccinate, carboxylate, and phosphate; cationic groups such as amine salts, including quaternary amine salts; amphoteric groups; and zwitterionic groups selected from the group consisting of betaine, +N—C—CO2-, and lecithin. The hydrophilic monomers may have single Z substituents or combinations of Z groups. The Z group is present as its hydrogen substituted form or as a salt.

Typical ionic monomers include, for example, methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate, vinyl pyrridine, N-vinyl pyrridine, and 2-acrylamido-2-propane sulfonic acid.

Examples of polymerization methods include but are not limited to free radical processes, Group Transfer Processes (GTP), radical addition fragmentation (RAFT), atom transfer reaction (ATR), and the like.

The overall polymeric dispersant has a number average molecular weight (Mn) of about 2,000 to about 20,000 Daultons, more typically about 4,000 to about 12,000 Daultons, and an acid number of about 40 to about 220 (mg KOH/g polymer solids), more typically of about 50 to about 150. The weight ratio of pigment to dispersion (P/D) is typically between about 0.5 and 5.

The polymeric dispersant is typically present in the range of about 0.1 to about 20% by weight, more typically in the range of about 0.2 to about 10% by weight, and still more typically in the range of about 0.25% to about 5% by weight, based on the weight of the total ink composition.

Pigment:

A wide variety of organic and inorganic pigments, alone or in combination, may be selected to make the pigment dispersion and ink. The term "pigment" as used herein means an insoluble colorant. The pigment particles are sufficiently small to permit free flow of the ink through the ink jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698, incorporated herein by reference.

Some examples of pigments with coloristic properties useful in ink jet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I." designation established by Society Dyers and Colourists, Bradford, Yorkshire, UK and published in The Color Index, Third Edition, 1971. Commercial sources of pigment are generally well known in the art.

In the case of organic pigments, the ink may contain up to approximately 30% pigment by weight, typically about 0.1 to about 25% pigment by weight, and more typically about 0.25 to about 10% pigment by weight, based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Ink Vehicle

The pigmented ink of this disclosure comprises an ink vehicle typically an aqueous ink vehicle, also known as an aqueous carrier medium, the aqueous colorant dispersion and optionally other ingredients.

The ink vehicle is the liquid carrier (or medium) for the aqueous colorant dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from about 30% water/about 70% diethylene glycol to about 95% water/about 5% diethylene glycol. The more typical ratios are about 60% water/about 40% diethylene glycol to about 95% water/about 5% diethylene glycol. Percentages are based on the total weight of the ink vehicle. A mixture of water and butyl carbitol is also an effective ink vehicle.

The amount of ink vehicle in the ink is typically in the range of about 70% to about 99.8%, and more typically about 80% to about 99.8%, based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are typical. 1,2-C4-6 alkanediols, are more typical, 1,2-hexanediol, is most typical. Some suitable surfactants include ethoxylated acetylene diols (e.g. Surfynol@ series from Air Products), ethoxylated alkyl primary alcohols e.g. Neodol® series from Shell) and alkyl secondary alcohols (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added should be properly determined, but it is typically in the range of from about 1 to about 15% by weight, and more typically about 2 to about 10% by weight, based on the total weight of the ink. Surfactants may be used, typically in the amount of about 0.01 to about 5% and typically about 0.2 to about 2%, based on the total weight of the ink.

Biocides may be used to inhibit growth of microorganisms.

Pigmented ink jet inks typically have a surface tension in the range of about 20 mN·m$^1$ to about 70 mN·m$^1$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even, advantageously, less than about 3.5 mPa·s.

Preparation of Pigmented Dispersions

The pigmented dispersions of this disclosure may be prepared using any conventional milling process known in the art. Most milling processes use a two-step process involving a first mixing step followed by a second grinding step. The first step comprises a mixing of all the ingredients, that is, pigment, dispersants, liquid carriers, pH adjuster and any optional additives to provide a blended "premix". Typically all liquid ingredients are added first, followed by the dispersants and lastly the pigment. Mixing is generally done in a stirred mixing vessel and High Speed Dispersers, (HSD), are particularly suitable for the mixing step. A Cowels type blade attached to the HSD and operated at 500 rpm to 4000 rpm, and typically 2000 rpm to 3500 rpm, provides optimal shear to achieve desired mixing. Adequate mixing is achieved usually in mixing from 15 minutes to 120 minutes.

The second step comprises milling of the premix to produce a stable pigmented dispersion. A typical milling process for carbon black pigments that avoids media contamination is the Microfluidizer Process, although other milling techniques can be used. In a specific embodiment, a labscale model M-110Y High Pressure Pneumatic, Microfluidizer with a diamond Z-Chamber from Microfluidics of Newton, Mass. may be used. The Microfluidizer uses an impingement process at high pressures to deaggomerate and mill fine particles, such as pigments. The model M-110Y Microfluidizer can operate at pressure ranges of about 3,000 to about 23,000 psi, although pressures of 10,000 to 15,000 are typical. The flow rates through the microfluidizer were typically 200 to 500 ml/min. and more typically 300 to 450 ml/min.

The milling may be done using a staged procedure in which a fraction of the solvent may be held out of the grind and added after milling is completed. This amount of solvent held out during milling may vary by dispersion and is typically 100 to 300 grams of the total 600 gram batch size. This may be done to achieve optimal rheology and viscosity for grinding efficiency. Each dispersion may be processed for a total of 10 passes through the mill although the endpoint may be achieved in less milling time.

After completion of milling process, each dispersion may be filled into a polyethylene container. Optionally, the dispersion may be further processed using conventional filtration procedures known in the art. The dispersions may be processed using ultrafiltration techniques to remove co-solvent(s) and other contaminants, ions or impurities from the dispersion. Each dispersion may be then tested for pH, conductivity, viscosity and particle size. Dispersion stability is deemed important to demonstrating the utility of the dispersing resins. Dispersion stability testing included measuring pH, conductivity, viscosity and particle size after oven aging of samples for 1 week at 70° C. and noting if significant change versus initial readings had occurred.

Pigmented dispersions may be prepared using the pigment identified earlier. The premix may be prepared at typically 23% pigment loading and the dispersant level was set at a P/D (pigment/dispersant), most typically at a P/D of 2.5. A P/D of 2.5 corresponds to a 40% dispersant level on pigment The dispersant resins may be neutralized with either alkali metal hydroxide such as LiOH, KOH, NaOH, or amine to facilitate solubility and dissolution into water. The neutralization process can be done either in situ during the premix stage or by pre-neutralizing the resin during the final stage of manufacture.

During the premix stage the pigment level may be maintained at about 18 to about 30, more typically about 23%, and was reduced to about 12 to about 18, more typically about 15% during the milling stage by adding deionized water. for optimal milling conditions. After completing the Microfluization milling process, the dispersions may be reduced to about 10% pigment concentration by adding the de-ionized water and thoroughly mixing. Next, the dispersion may be filtered through a filter, for example a 0.3 micron Chipwich filter, available from Pall Trincor of East Falls, N.Y., to remove any possible contaminants and placed in a 1000 ml polyethylene container.

Method of Printing:

A typical printer will generally comprise at least four differently colored inks such as a cyan, magenta, yellow and black (CMYK) ink. Ink sets may further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets may include one or more colorless inks which are printed in combination with the colored inks to enhance properties such as optical density, chroma, durability and/or gloss.

According to one embodiment of the disclosure, a method of ink jet printing onto a substrate is provided comprising, in any workable order, the steps of:

(a) providing an ink jet printer that is responsive to digital data signals;

(b) loading the printer with a substrate to be printed;

(c) loading the printer with an aqueous ink jet ink comprising an ink vehicle and an aqueous colorant dispersion, wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

$$CH_2=CRC(O)O(CHR_1CH_2O)nR_2$$

wherein R and $R_1$ are H, or methyl;

$R_2$ is alkyl of 1-4 carbon atoms or phenyl; and n is about 1 to about 20, more typically about 1 to about 10;

and the B block is a segment comprising an ionic monomer and at least one hydrophobic monomer; and wherein the dispersant is neutralized, and (d) printing onto the substrate using the aqueous ink jet ink, in response to the digital data signals to form a printed image on the substrate.

The inks of the present disclosure can be printed with any suitable inkjet printer, including printers equipped with piezo or thermal print heads. Some examples of thermal ink jet print heads are the Hewlett Packard Deskjet, and Canon iPIXMA iP4200, and some examples of piezo print heads are Brother MFC3360C, and Epson Stylus C120. Some suitable print heads are disclosed in U.S. Pat. No. 6,161,918, U.S. Pat. No. 4,490,728, and U.S. Pat. No. 6,648,463, the disclosures of which are incorporated herein by reference. The substrate can be any suitable substrate including plain paper, such as common electrophotographic copier paper; treated paper, such as photo-quality inkjet paper. The present disclosure is particularly advantageous for printing on plain paper.

The following examples illustrate the disclosure without, however, being limited thereto.

EXAMPLES

In the following examples, unless otherwise stated, water was deionized and ingredient amounts were in weight percent of the total weight of ink.

GLOSSARY

Surfynol® 465 surfactant from Air Products (Allentown, Pa. USA).

Proxel™ GXL Biocide from Avecia (Wilmington, Del., USA).

Glycereth-26, 26 mole ethylene oxide adduct of glycerin.

Polymeric Dispersants

The dispersant polymers used to make the dispersions were synthesized by established methods as described, for example, in U.S. Pat. Nos. 5,085,698. and 5,852,075 along with U.S. patent publication US200510090599, the disclosures of which are incorporated by reference herein as if fully set forth.

It should be noted that, in referring to the polymer compositions, a double slash indicates a separation between blocks and a single slash indicates a random copolymer. Thus, BzMA//MAA//BzMA 8//10//8 is an ABA triblock polymer with a first A block that is on average 8 BzMA (Benzyl Methacrylate) units long, a B block that is on average 10 MAA (Methacrylic Acid) units long, and a final A block that is on average 8 BZMA units long.

The following synthetic examples were all based on group transfer polymerization (GTP), although other types of polymerization processes can be used to generate similar types of polymers. In the case of the block polymers, the current block was at least 95% converted before adding the mixture of monomers for the next block. In all cases, the feed cycle strategy is described. However, the synthesis was terminated when 99% of the monomer was converted as detected by HPLC with mesitylene as an internal standard. The molecular weight reported (unless otherwise noted) was based on theoretical considerations. For the random linear polymers, all monomer ratios were reported as the mole ratios of the monomer components, and represented the theoretical degree of polymerization for each block or set of monomer units. Polymeric dispersants were routinely synthesized in dry THF and converted to a solution in 2-pyrrolidone (2P) by distilling the THF while replacing with 2P.

Standard laboratory techniques for handling water sensitive chemicals were employed for the following examples. For example, glassware was extensively dried before use, monomers were stored over sieves, and cannulation procedures were used to keep material dry.

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The particle size was determined by dynamic light scattering using a Microtrac Analyzer, Largo Fla. For many of the dispersion steps, a Model 100 F or Y, Microfluidics System was used (Newton Mass.).

The polymeric dispersants are summarized in the table below. Details include dispersant # from cross-referencing with ink and pigment dispersion data, polymer structure in terms of DP or chain length for each monomer unit, architecture (diblock vs random), theoretical number average molecular weight (Mn), and theoretical acid number (mg KOH/g solids). The measured acid number and Mn by GPC are included in the polymer preparation. Note, the polymer composition may also be expressed in terms of weight % for each monomer component. However, in an effort to facilitate comparison between random and block copolymer, these polymer structure are represented in the detailed fashion of monomer unit DP.

Control Dispersant 1: Diblock 4ETEGMA//30BMA/6MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 1326 g, was cannulated to the flask. Initiator (1,1-bis(trimethylsilyloxy)-2-methyl propene, 57.2 g (0.247 moles)) was injected followed by catalyst (tetrabutyl ammonium m-chlorobenzoate, 1.5 ml of a 1.0 M solution in acetonitrile). Catalyst solution (tetrabutyl ammonium m-chlorobenzoate, 1.1 ml of a 1.0 M solution in acetonitrile and THF, 6 g) was syringe pumped during both the monomer feeds. Monomer feed 1 (trimethylsilyl methacrylate 234.4 g (1.78 mol) and butyl methacrylate, 1045.3 g (7.36 mol)) was added over 90 minutes while the reaction exothermed to 69.8° C. After a 1 hr hold, HPLC indicated greater than 98% monomer conversion, and then, monomer feed II (ethyl triethylene glycol methacrylate, 242.5 g (0.985 mol)) was added over 15 minutes.

The ETEGMA conversion was greater than 99.5%, 3 hr after the feed was complete. 110 g of methanol were added, and then the THF and other volatile by-products were distilled by slowly heating to 120° C. while adding 2-pyrrolidone (2P). The final polymer solution was 43.5% solids with a measured acid number of 82.2 mg KOH/gram of polymer solids.

Control Dispersant 2: Diblock 4ETEGMA//20BMA/4MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 770 g, was cannulated to the flask. Initiator (1,1-bis(trimethylsilyloxy)-2-methyl propene, 33.7 g (0.145 moles)) was injected followed by catalyst (tetrabutyl ammonium m-chlorobenzoate, 0.9 ml of a 1.0 M solution in acetonitrile). Catalyst solution (tetrabutyl ammonium m-chlorobenzoate, 0.7 ml of a 1.0 M solution in acetonitrile and THF, 10 g) was syringe pumped during both the monomer feeds. Monomer feed 1 (trimethylsilyl methacrylate 95.7 g (0.725 mol) and butyl methacrylate, 411.1 g (2.895 mol)) was added over 60 minutes while the reaction exothermed to 53° C. After a 1 hr hold, HPLC indicated greater than 97% monomer conversion, and then, monomer feed II (ethyl triethylene glycol methacrylate, 144.1 g (0.586 mol)) was added over 15 minutes.

The ETEGMA conversion was greater than 97%, 45 min after the feed was complete. 46.3 g of methanol were added, and then the THF and other volatile by-products were distilled by slowly heating to 120° C. while adding 2-pyrrolidone (2P). The final polymer solution was 49.8 solids with a measured acid number of 62.3 mg KOH/gram of polymer solids. The molecular weight of this polymer as measured by GPC was Mn 5039, Mw 5304, and PD 1.05.

| Dispersant # | Polymer Structure (DP) | Architecture | Theor. Mn | Theor. Acid # |
|---|---|---|---|---|
| Control Dispersant 1 | 4ETEGMA//30BMA/6MAA | Diblock | 5847 | 67 |
| Control Dispersant 2 | 4ETEGMA//20BMA/4MAA | Diblock | 4255 | 66 |
| Dispersant 1 | 8ETEGMA//20BMA/4MAA | Diblock | 5240 | 54 |
| Dispersant 2 | 8ETEGMA//30BMA/6MAA | Diblock | 6832 | 57 |
| Dispersant 3 | 12ETEGMA//30BMA/6MAA | Diblock | 7818 | 50 |
| Dispersant 4 | 4ETEGMA/4DMAEMA//30BMA/6MAA | Diblock | 6475 | 61 |
| Dispersant 5 | 8ETEGMA//30BMA/11MAA | Diblock | 7260 | 93 |
| Dispersant 6 | 8ETEGMA//49BMA/20MAA | Diblock | 10732 | 110 |
| Dispersant 7 | 12ETEGMA//30BMA/11MAA | Diblock | 8244 | 82 |
| Comp Dispersant 1 | 8HEMA//30BMA/6MAA | Diblock | 6270 | 60 |
| Comp Dispersant 2 | 30BMA6MAA8ETEGMA | Random | 6832 | 57 |

Dispersant 1: Diblock 8ETEGMA//20BMA/4MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 705 g, was cannulated to the flask. Initiator (1,1-bis(trimethylsilyloxy)-2-methyl propene, 30.8 g (0.133 moles)) was injected followed by catalyst (tetrabutyl ammonium m-chlorobenzoate, 0.8 ml of a 1.0 M solution in acetonitrile). Catalyst solution (tetrabutyl ammonium m-chlorobenzoate, 0.6 ml of a 1.0 M solution in acetonitrile and THF, 10 g) was syringe pumped during both the monomer feeds. Monomer feed 1 (trimethylsilyl methacrylate 84.0 g (0.636 mol) and butyl methacrylate, 378.3 g (2.664 mol)) was added over 60 minutes while the reaction exothermed to 53° C. After a 1 hr hold, HPLC indicated greater than 97% monomer conversion, and then, monomer feed II (ethyl triethylene glycol methacrylate, 260.3 g (1.06 mol)) was added over 20 minutes.

The ETEGMA conversion was greater than 99.5% 60 min after the feed was complete. 46.3 g of methanol were added, and then the THF and other volatile by-products were distillated by slowly heating to 120° C. while adding 2-pyrrolidone (2P). The final polymer solution was 51.14 solids with a measured number of 61.7 mg KOH/gram of polymer solids. The molecular weight of this polymer as measured by GPC was Mn 5893, Mw 6272, and PD 1.06.

Dispersant 2: Diblock 8ETEGMA//30BMA/6MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 605 g, was cannulated to the flask. Initiator (1,1-bis(trimethylsilyloxy)-2-methyl propene, 28.5 g (0.123 moles)) was injected followed by catalyst (tetrabutyl ammonium m-chlorobenzoate, 0.7 ml of a 1.0 M solution in acetonitrile). Catalyst solution (tetrabutyl ammonium m-chlorobenzoate, 0.5 ml of a 1.0 M solution in acetonitrile and THF, 10 g) was syringe pumped during both the monomer feeds. Monomer feed 1 (trimethylsilyl methacrylate 108.6 g (0.833 mol) and butyl methacrylate, 486.8 g (3.43 mol)) was added over 60 minutes while the reaction exothermed to 65° C. After a 1 hr hold, HPLC indicated greater than 95% monomer conversion, and then, monomer feed II (ethyl triethylene glycol methacrylate, 224.1 g (0.910 mol)) was added over 60 minutes.

The ETEGMA conversion was greater than 98% 30 min after the feed was complete. 50.8 g of methanol were added, and then the THF and other volatile by-products were distillated by slowly heating to 120° C. while adding 2-pyrrolidone (2P). The final polymer solution was 49.3% solids with a measured number of 57.3 mg KOH/gram of polymer solids. The molecular weight of this polymer as measured by GPC was Mn 7988, Mw 8529, and PD 1.07.

Dispersant 3: Diblock 12ETEGMA//30BMA/6MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 1137 g, was cannulated to the flask. Initiator (1,1-bis(trimethylsilyloxy)-2-methyl propene, 49.2 g (0.212 moles)) was injected followed by catalyst (tetrabutyl ammonium m-chlorobenzoate, 1.3 ml of a 1.0 M solution in acetonitrile). Catalyst solution (tetrabutyl ammonium m-chlorobenzoate, 1.0 ml of a 1.0 M solution in acetonitrile and THF, 4.4 g) was syringe pumped during both the monomer feeds. Monomer feed 1 (trimethylsilyl methacrylate 201.1 g (1.52 mol) and butyl methacrylate, 901.2 g (6.35 mol)) was added over 60 minutes while the reaction exothermed to 65° C. After a 1 hr hold, HPLC indicated greater than 99% monomer conversion, and then, monomer feed II (ethyl triethylene glycol methacrylate, 626.2 g (2.54 mol)) was added over 15 minutes.

After 1 hr at reflux, the ETEGMA conversion was greater than 97%. 50.8 g of methanol were added, and then the THF and other volatile by-products were distillated by slowly heating to 120° C. while adding 2-pyrrolidone (2P). The final polymer solution was 41.4% solids. with a measured number of 75 mg KOH/gram of polymer solids.

Dispersant 4: Diblock 4ETEGMA/4DMAEMA//30BMA/7MAA

A 3-liter round bottom was dried with a heat gun under nitrogen purge and equipped with a mechanical stirrer, thermocouple, $N_2$ inlet, drying tube outlet, and addition funnels. Tetrahydrofuran (THF), 620 g, was cannulated to the flask. Initiator (1,1-bis(trimethylsilyloxy)-2-methyl propene, 26.6 g (0.115 moles)) was injected followed by catalyst (tetrabutyl ammonium m-chlorobenzoate, 0.7 ml of a 1.0 M solution in acetonitrile). Catalyst solution (tetrabutyl ammonium m-chlorobenzoate, 0.5 ml of a 1.0 M solution in acetonitrile and THF, 13 g) was syringe pumped during both the monomer feeds. Monomer feed 1 (trimethylsilyl methacrylate 127.5 g (0.966 mol) and butyl methacrylate, 488.5 g (3.44 mol)) was added over 60 minutes while the reaction exo-thermed to 64° C. After 60 min hold, HPLC indicated greater than 96% monomer conversion, and then, monomer feed II (ethyl triethylene glycol methacrylate, 117.4 g (0.477 mol) and 2-(dimethylamino)ethyl methacylate, 72.5 g (0.462 mol)) was added over 15 minutes.

After 20 min, the monomer conversion was greater than 96%. Added 59 g of methanol, and then the THF and other volatile by-products were distillated by slowly heating to 120° C. while adding 2-pyrrolidone (2P). The final polymer solution was 45.6% solids with a measured number of 78.5 mg KOH/gram of polymer solids.

Dispersant 5: Diblock 8ETEGMA//30BMA/11MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 2423 g, was cannulated to the flask. Initiator (1,1-bis(trimethylsilyloxy)-2-methyl propene, 98.82 g (0.426 moles)) was injected followed by catalyst (tetrabutyl ammonium m-chlorobenzoate, 2.6 ml of a 1.0 M solution in acetonitrile). Catalyst solution (tetrabutyl ammonium m-chlorobenzoate, 2.1 ml of a 1.0 M solution in acetonitrile and THF, 16.1 g) was syringe pumped during both the monomer feeds. Monomer feed 1 (trimethylsilyl methacrylate 728.7 g (4.61 mol) and butyl methacrylate, 1790.9 g (12.61 mol)) was added over 60 minutes while the reaction exo-thermed to 65° C. After a 1 hr hold, HPLC indicated greater than 95% monomer conversion, and then, monomer feed II (ethyl triethylene glycol methacrylate, 825.3 g (3.35 mol)) was added over 15 minutes.

The ETEGMA conversion was greater than 98% 90 min after the feed was complete. 322.6 g of methanol were added, and then the THF and other volatile by-products were distillated by slowly heating to 120° C. while adding 2-pyrrolidone (2P). The final polymer solution was 45.1% solids with a measured number of 98.2 mg KOH/gram of polymer solids. The molecular weight of this polymer as measured by GPC was Mn 9018, Mw 9635, and PD 1.07.

Dispersant 6: Diblock 8ETEGMA//49BzMA/20MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 1046 g, was cannulated to the flask. Initiator (1,1-bis(trimethylsilyloxy)-2-methyl propene, 34.7 g (0.150 moles)) was injected followed by catalyst (tetrabutyl ammonium m-chlorobenzoate, 0.9 ml of a 1.0 M solution in acetonitrile). Catalyst solution (tetrabutyl ammonium m-chlorobenzoate, 0.7 ml of a 1.0 M solution in acetonitrile and THF, 3 g) was syringe pumped during both the monomer feeds. Monomer feed 1 (trimethylsilyl methacrylate 459.5 g (2.91 mol) and benzyl methacrylate, 1253.2 g (7.12 mol)) was added over 60 minutes while the reaction exo-thermed to 65° C. After a 1 hr hold, HPLC indicated greater than 95% monomer conversion, and then, monomer feed II (ethyl triethylene glycol methacrylate, 286 g (1.16 mol)) was added over 20 minutes.

After 1 hr relux, the ETEGMA conversion was greater than 97%. Then, 195 g of methanol were added, and THF and other volatile by-products were distilled by slowly heating to 120° C. while adding 2-pyrrolidone (2P). The final polymer solution was 41.3% solids with a measured number of 95.6 mg KOH/gram of polymer solids.

Dispersant 7: Diblock 12ETEGMA//30BzMA/11MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 1043.5 g, was cannulated to the flask. Initiator (1,1-bis(trimethylsilyloxy)-2-methyl propene, 45.44 g (0.195 moles)) was injected followed by catalyst (tetrabutyl ammonium m-chlorobenzoate, 1.2 ml of a 1.0 M solution in acetonitrile). Catalyst solution (tetrabutyl ammonium m-chlorobenzoate, 0.9 ml of a 1.0 M solution in acetonitrile and THF, 4.1 g) was syringe pumped during both the monomer feeds. Monomer feed 1 (trimethylsilyl methacrylate 340.4 g (2.15 mol) and butyl methacrylate, 834.4 g (5.88 mol)) was added over 60 minutes while the reaction exo-thermed to 65° C. After a 1 hr hold, HPLC indicated greater than 95% monomer conversion, and then, monomer feed II (ethyl triethylene glycol methacrylate, 578.9 g (2.35 mol)) was added over 15 minutes.

When the ETEGMA conversion was greater than 98%, 150.4 g of methanol were added, and then the THF and other volatile by-products were distilled by slowly heating to 120° C. while adding 2-pyrrolidone (2P). The final polymer solution was 45.6% solids with a measured number of 82.6 mg KOH/gram of polymer solids. The molecular weight of this polymer as measured by GPC was Mn 9770, Mw 10700, and PD 1.10.

Comparative Dispersant 1: Diblock 8HEMA//30BMA/6MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 1247 g, was cannulated to the flask. Initiator (1,1-bis(trimethylsilyloxy)-2-methyl propene, 54.3 g (0.233 moles)) was injected followed by catalyst (tetrabutyl ammonium m-chlorobenzoate, 1.4 ml of a 1.0 M solution in acetonitrile). Catalyst solution (tetrabutyl ammonium m-chlorobenzoate, 1.4 ml of a 1.0 M solution in acetonitrile and THF, 5.0 g) was syringe pumped during both the monomer feeds. Monomer feed 1 (trimethylsilyl methacrylate 222.7 g (1.40 mol) and butyl methacrylate, 994.7 g (7.0 mol)) was added over 60 minutes while the reaction exo-thermed to 65° C. After a 1 hr hold, HPLC indicated greater than 95% monomer conversion, and then, monomer feed 11(2-(trimethylsiloxy)ethyl methacrylate, 377.6 g (1.87 mol)) was added over 60 minutes.

The TMS-HEMA conversion was greater than 98% 30 min after the feed was complete. 104.5 g of methanol were added, and after 20 minutes, 29.6 g water and 0.26 g dichloroacetic acid were added. The reaction was refluxed for 2 hrs to deblock the TMS-HEMA. Then, the THF and other volatile by-products were distillated by slowly heating to 120° C. while adding 2-pyrrolidone (2P). The final polymer solution was 41.9% solids with a measured number of 62.9 mg KOH/gram of polymer solids. The molecular weight of this polymer as measured by GPC was Mn 7658, Mw 8136, and PD 1.06.

Comparative Dispersant 2: Random 30BMA6MAA8ETEGMA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 771.5 g, was cannulated to the flask. Initiator (1,1-bis(trimethylsilyloxy)-2-methyl propene, 31.93 g (0.138 moles)) was injected followed by catalyst (tetrabutyl ammonium m-chlorobenzoate, 0.8 ml of a 1.0 M solution in acetonitrile). Catalyst solution (tetrabutyl ammonium m-chlorobenzoate, 0.7 ml of a 1.0 M solution in acetonitrile and THF, 18.6 g) was syringe pumped during the monomer feed. Monomer feed (trimethylsilyl methacrylate 129.51 g (0.823 mol), ethyl triethylene glycol methacrylate, 268.86 g (1.08 mol) and butyl methacrylate, 886.7 g (6.24 mol)) was added over 60 minutes while the reaction exo-thermed to 72° C. After a 60 min hold, HPLC indicated greater than 96% monomer conversion.

Then, 156 g of methanol were added, and THF and other volatile by-products were distilled by slowly heating to 120° C. while adding 2-pyrrolidone (2P). The final polymer solution was 47.1% solids with a measured number of 80.85 mg KOH/gram of polymer solids. The molecular weight of this polymer as measured by GPC was Mn 6772, Mw 7297, and PD 1.08.

Preparation of Pigmented Dispersions

The carbon black pigmented dispersions were prepared using Degussa's Nipex® 180 IQ carbon black pigment. Each carbon black premix was prepared at 23% pigment loading and the amount of dispersant was set at a P/D (pigment/dispersant) of 2.5 that corresponded to a 40% level of active dispersant on pigment. Neutralization of the dispersants was done using a 4.56% active KOH solution. The neutralization process was done "In Situ" in the Premix step for Pigment Dispersions 2, 3, 4, 5 and C-2. Dispersion 1 and Comparative Pigment Dispersion 1, C-1, were made using pre-neutralized resin which was done with KOH during the final stage of resin manufacture.

Pigment Dispersion 1 (Control):

Pigment Dispersion1 was prepared using a two step process in which the dispersion ingredients were added to a 1 Liter stainless steel pot in the order shown below. The premix step used a High Shear Disperser, HSD, with a 60 mm Cowels blade operated at 3500 rpm which ran for 2 hours. The pigment dispersion milling was performed using a labscale model M-110Y High Pressure Pneumatic, Microfluidizer with a diamond Z-Chamber available from Microfluidics of Newton, Mass. Pigment Dispersion 1 was processed at a pressure of 15,000 psi for a total of 12 passes through the Microfluidizer.

Step 1: Premix

A 900 gram dispersion sample was prepared by adding the following ingredients, in the order listed below, to a 1 Liter stainless steel pot. Each ingredient was added slowly with mixing using an HSD, High Shear Disperser, equipped with a 60 mm Cowels blade and operated at roughly 1000 rpm during ingredient loading. The pigment loading in the premix step was 23%.

| Ingredients | Amount (g) |
|---|---|
| Deionized water | 129.6 |
| Control Dispersant 1 (BMA/MAA//ETEGMA 30/6//4) | 171.8 |
| KOH Solution (4.56% Active) (dispersant pre-neutralized with KOH) | 0.0 |
| Nipex ® 180 carbon black pigment | 90.0 |

After all ingredients were loaded, the High Speed Disperser speed was increased to 3500 rpm and the contents were processed for 2 hours. Next, additional deionized water (208.6 grams) was added to reduce the pigment level in the dispersion to 15% which is the level used in the Microfluidization milling stage.

Step 2: Milling

The premix prepared in Step 1 was milled using a labscale model M-110Y High Pressure Pneumatic, Microfluidizer with a diamond Z-Chamber from Microfluidics of Newton, Mass. The dispersion was milled for a total of 12 passes at a flow-rate of 440 ml/min and pressure of 15,000 psi. After milling was completed at 15% pigment, a final Deionized water letdown of 300 grams was added to reduce the final pigment loading to 10.0%.

The pigment dispersion was filtered through a 0.3 micron Chipwich filter available from Pall Trincor of East Falls, N.Y. and collected into a 1000 ml polyethylene container. The final pigment dispersion batch size totaled 900 grams. The properties of pH, viscosity, particle size (D50 and D95) and Accusizer of the pigment dispersion were tested and are reported in Table 1.

Pigment Dispersions 2 (Control), 3, 4, 5 and Comparative Pigment Dispersions 1 and 2:

Pigment Dispersions 2 (Control), 3, 4, 5 and Comparative Pigment Dispersions 1 and 2 were made using a similar Microfluidization Process of 12 passes at 15,000 psi as described for Pigment Dispersion 1 with the following exceptions:

Pigment Dispersion 2 (Control) was made using Control Dispersant 2: BMA/MAA//ETEGMA, 20/4//4 and in situ neutralized in the premix stage with 4.56% active KOH solution.
Pigment Dispersion 3 was made using Dispersant 1: BMA/MAA//ETEGMA, 20/4//8 and in situ neutralized in the premix stage with 4.56% active KOH solution.
Pigment Dispersion 4 was made using Dispersant 2: BMA/MAA//ETEGMA, 30/6//8 and in situ neutralized in the premix stage with 4.56% active KOH solution.
Pigment Dispersion 5 was made using Dispersant 4: BMA/MAA//ETEGMA/DMAEMA, 30/6//4/4 and in situ neutralized in premix stage with 4.56% active KOH solution.
Comparative Pigment Dispersion 1, C-1, was made using Comparative Dispersant 1: BMA/MAA/ETEGMA, 30/6/4 Random Polymer and used pre-neutralized polymer similar to Dispersant 1.
Comparative Pigment Dispersion 2, C-2, was made using Comparative Dispersant 2, BMA/MAA//HEMA, 30/6//8, a structured di-block polymer and was in situ neutralized in premix stage with 4.56% active KOH solution.

TABLE 1

Initial Pigment Dispersion Properties, Day 1 @ Room Temperature

| Pigment Dispersion | Dispersant Composition | Pigment | % Pig | P/D | pH | Viscosity (cps)$^2$ | D50 | D95 | Accusizer ($\times 10^7$ counts/ml) |
|---|---|---|---|---|---|---|---|---|---|
| 1 (Control) | BMA/MAA//ETEGMA 30/6//4 | Nipex ® 180 | 9.84 | 2.50 | 9.37 | 2.71 | 103 | 159 | 12 |
| 2 (Control) | BMA/MAA//ETEGMA 20/4//4 | Nipex ® 180 | 9.49 | 2.50 | 8.77 | 2.63 | 103 | 161 | 12 |
| 3 | BMA/MAA//ETEGMA 20/4//8 | Nipex ® 180 | 9.06 | 2.50 | 9.19 | 2.34 | 93 | 183 | 12 |
| 4 | BMA/MAA//ETEGMA 30/6//8 | Nipex ® 180 | 10.26 | 2.50 | 9.07 | 3.16 | 103 | 169 | 15 |
| 5 | BMA/MAA//ETEGMA/DMAEMA 30/6//4/4 | Nipex ® 180 | 10.29 | 2.50 | 9.71 | 2.96 | 96 | 182 | 12 |
| C-1 | BMA/MAA/ETEGMA 30/6/4 Random | Nipex ® 180 | 10.08 | 2.50 | 8.95 | 3.04 | 113 | 171 | 25 |
| C-2 | BMA/MAA//HEMA 30/6//8 | Nipex ® 180 | 11.98 | 2.50 | 8.83 | 3.60 | 103 | 202 | 19 |

Pigment Dispersion 6 (Magenta):

Pigment Dispersion 6 was made using a media milling process using a lab-scale Eiger Minimill, model M250, VSE EXP from Eiger Machinery Inc. Chicago, Ill. The first step comprised the mixing of all the ingredients, that is, pigment, dispersants, KOH, pH adjuster, to provide a blended "premix". All liquid ingredients were added first, followed by the KOH solution which was used to neutralize "in situ" the dispersant and lastly the pigment. Mixing was done in a stirred 1 Liter stainless steel mixing vessel using a high-speed disperser, (HSD), with a 60 mm Cowels type blade attached to the HSD operated at 3500 rpm for a total mixing time of 2 hrs. The pigment loading in the premix step was 25%.

| Ingredients | Amount (g) |
|---|---|
| Deionized water | 146.1 |
| Dispersant 2 (BMA/MAA//ETEGMA 30/6//8) @49.3% solids | 73.0 |
| KOH Solution (4.56% Active) | 50.9 |
| Pigment Red 269 (European Color) | 90.0 |

After premixing for 2 Hrs at 3500 rpm using the HSD, additional DI water was added to reduce pigment loading to 23% which gave the desired rheology and was the level used during the media milling stage.

| Ingredients | Amount (g) |
|---|---|
| Deionized water | 31.3 |

Next the media milling or grinding step was performed by charging 820 grams of 0.5 YTZ zirconia media to the mill.

The dispersion was processed using a re-circulation grinding process with a mill disk speed of 3500 rpm and flow rate of 350 grams per min. The milling was done using a staged procedure in which 20% of the DI water was held out during the grind and added after milling was completed. The dispersion was processed for a total of 4 hours milling time.

After completion of the milling step the final letdown of DI water was added and mixed in reducing the pigment loading in the dispersion to 10%.

| Ingredients | Amount (g) |
|---|---|
| Deionized water (final letdown) | 508.7 |

The pigment dispersion was filtered through a 0.3 micron Chipwich filter available from Pall Trincor of East Falls, N.Y. and collected into a 1000 ml polyethylene container. The final pigment dispersion batch size totaled 900 grams at 10% pigment loading.

Pigment Dispersion 7 (Magenta):

Pigment Dispersion 7 was prepared by a process similar to the Eiger Minimill process described for Pigment Dispersion 6 with the following exception: Pigment Red 269 (European Color) was dispersed with Comparative dispersant 1 (8HEMA//30BMA/6MAA) at a P/D of 2.5.

Pigment Dispersion 8 (Yellow):

Pigment Dispersion 8 was prepared by a process similar to the Eiger Minimill process described for Pigment Dispersion 6 with the following exception: Pigment Yellow 74 (Sun Chemical) was dispersed with Dispersant 2 (8ETEGMA//30BMA/6MAA) at a P/D of 2.5.

Pigment Dispersion 9 (Yellow):

Pigment Dispersion 9 was prepared by a process similar to the Eiger Minimill process described for Pigment Dispersion 6 with the following exception: Pigment Yellow 74 (Sun Chemical)) was dispersed with Comparative Dispersant 1 (8HEMA//30BMA/6MAA) at a P/D of 2.5.

Pigment Dispersion 10 (Magenta)

Pigment Dispersion 10 was prepared by a process similar to the Eiger Minimill process described for Pigment Dispersion 6 with the following exception: Sun Chemical PR 269 was dispersed with Dispersant 5 (30BMA/11MAA//8ETEGMA) at a P/D of 2.

Pigment Dispersion 11 (Magenta)

Pigment Dispersion 11 was prepared by a process similar to the Eiger Minimill process described for Pigment Dispersion 6 with the following exception: Clariant PR122E-02 was dispersed with Dispersant 5 (30BMA/11MAA//8ETEGMA) at a P/D of 2.

Pigment Dispersion 12 (Magenta)

Pigment Dispersion 12 was prepared by a process similar to the Eiger Minimill process described for Pigment Dispersion 6 with the following exception: Clariant PR122E-02 was dispersed with Dispersant 6 (49BzMA/20MAA//8ETEGMA) at a P/D of 2.

Pigment Dispersion 13 (Magenta)

Pigment Dispersion 12 was prepared by a process similar to the Eiger Minimill process described for Pigment Dispersion 6 with the following exception: Clariant PR122E-02 was dispersed with Dispersant 6 (12ETEGMA//30BzMA/11MAA) at a P/D of 2.

Colored Ink Preparation:

Inks were prepared by stirring together the pigment dispersion and the other ink ingredients summarized in Table 1. The dispersion was added in an amount that provided 3% pigment solids in the final ink.

TABLE 2

| Ingredient | Ink M1 | Ink M2 | Ink M3 | Ink M4 | Ink M5 | Comp. Ink M2 | Ink Y1 |
|---|---|---|---|---|---|---|---|
| Pigment Dispersion 6 | 3.0% pigment | — | — | — | — | — | — |
| Pigment Dispersion 7 | — | — | — | — | — | 3.0% pigment | — |
| Pigment Dispersion 8 | — | — | — | — | — | — | 3.0% pigment |
| Pigment Dispersion 9 | — | — | — | — | — | — | — |
| Pigment Dispersion 10 | | 3.0% pigment | | | | | |
| Pigment Dispersion 11 | | | 3.0% pigment | | | | |
| Pigment Dispersion 12 | | | | 3.0% pigment | | | |
| Pigment Dispersion 13 | | | | | 4.5% Pigment | | |
| 1,2-hexanediol | 2.0% | 2.0% | 2.0% | 2.0% | 2.0% | 2.0% | 2.0% |
| Glycerol | 5.0% | 5.0% | 5.0% | 5.0% | 5.0% | 5.0% | 5.0% |
| Glycereth ® 26 | 5.0% | 5.0% | 5.0% | 5.0% | 5.0% | 5.0% | 5.0% |
| 2-Pyrrolidone | 5.0% | 5.0% | 5.0% | 5.0% | 5.0% | 5.0% | 5.0% |
| Ethylene glycol | 3.0% | 3.0% | 3.0% | 3.0% | 3.0% | 3.0% | 3.0% |
| Proxel ® GXL biocide | 0.2% | 0.2% | 0.2% | 0.2% | 0.2% | 0.2% | 0.2% |

Test Results

The inks were filled into cartridges and printed from an HP K550 printer. Optical density was measured with a Greytag Macbeth Spectrolino spectrometer.

Nozzle plate puddling was visually evaluated by stopping the printer after it had printed 2 pages of a high density print target and removing the printhead and observing it under a microscope.

The line width deviation is a measure of the misdirectionality of the jetted ink drops caused by the build up of liquid on the print face. The filled cartridge was used to print a test pattern repeatedly until the cartridge was empty, about 150 pages. For every tenth page the mean width deviation of a hairline on the print target was measured using ImageXpert. This value was averaged over the test and reported in the table below. A value less than 25 microns indicated the line was very sharp with few misplaced drops, higher values were indicative of misdirected drops.

The inks of this disclosure with ETEGMA block dispersant showed no nozzle plate wetting, had good optical density, and had low values for the hairline mean width deviation indicating good jet directionality. In contrast, the comparative inks with the random ETEGMA dispersant had poor jet directionality and significant nozzle plate wetting with reduced optical density and high values for the hairline mean width deviation. Results are shown in Table 3 below.

TABLE 3

| Ingredient | Ink M1 | Ink M2 | Ink M3 | Ink M4 | Ink M5 | Comp. Ink M2 | Ink Y1 | Comp. Ink Y2 |
|---|---|---|---|---|---|---|---|---|
| Optical Density HP Brochure & Flyer Paper | No data | No Data | No data | No Data | No Data | 1.10 | 1.43 | 1.29 |
| Optical Density HP Multipurpose Paper | 0.92 | 1.20 | 1.23 | 1.19 | 1.33 | 0.83 | 1.01 | 1.02 |
| Optical Density Xerox 4200 Paper | 0.87 | 1.02 | 1.00 | 1.01 | 0.94 | 0.76 | 0.89 | 0.91 |
| Nozzle plate puddling | No | No | No | No | No | Yes | No | Yes |
| Line Mean Width Deviation (microns) | 20 | 35 | 16 | 19 | 12 | 125 | 16 | 53 |

Black Ink Preparation:

Inks were prepared by stirring together the pigment dispersion and other ink ingredients according to the same general formulation summarized in the following table. The dispersion was added in an amount that provided 4% pigment solids in the final ink.

TABLE 4

| Ingredient | Weight % |
|---|---|
| Black Dispersion (as wt % pigment) | 4 |
| Diethyleneglycol | 3.6 |
| Glycerol | 3.4 |
| Trimethylolpropane | 3 |
| Glycereth-26 | 2 |
| Surfynol ® 465 | 0.5 |
| Proxel ™ GXL | 0.2 |
| Water (to 100%) | Balance |

Print Testing:

The black inks were printed with a Canon iPIXMA iP4200 (settings: plain media; high print quality; grayscale off). Optical density measurements (GretagMacbeth SpectroEye, made by GretagMacbeth AG, Regensdorf, Switzerland), for each black ink were made in areas without underprinting.

Results

The nozzle wetting test was done on several paper substrates and showed that TIJ printing of black inks made with inventive dispersants had significantly improved nozzle wetting performance. A summary of the results are shown below. In general, the data demonstrates that the nozzle plate wetting is proportional to the size of the ETEGMA containing block while maintaining all other critical inkjet properties (OD, bleed, highlighter smear, and stability).

Summary of Black Inks Printed on Xerox 4200 Paper

| Black Ink # | Dispersant # | ETEGMA block size | Fastness to Alkali Highliter | OD | Nozzle Wetting |
|---|---|---|---|---|---|
| 1 | 1 (Control) | 4 | 4 | 1.00 | 1.5 Poor |
| 2 | 2 (Control) | 4 | 3.5 | 0.92 | 2.0 So So |
| 3 | 3 | 8 | 4 | 0.91 | 3.0 Good |
| 4 | 4 | 8 | 3.5 | 0.95 | 4.0 V. Good |
| 5 | 6 | 4 + 4 DMAEMA | 4 | 0.93 | 4.0 V. Good |
| 6 | Comp #1 | 0 + 8HEMA | No Data | 0.95 | 2.5 So So |

What is claimed is:

1. An aqueous colorant dispersion comprising a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

$$CH_2\!\!=\!\!CRC(O)O(CHR_1CH_2O)nR_2$$

wherein R and $R_1$ are H, or methyl;
$R_2$ is alkyl of 1-4 carbon atoms or phenyl; and
n is about 1 to about 20; and
the B block is a segment comprising an ionic monomer and at least one hydrophobic monomer; and wherein the dispersant is neutralized.

2. The aqueous colorant dispersion of claim 1 wherein the polymeric dispersant is a linear polymer.

3. The aqueous colorant dispersion of claim 1 wherein the A block has a block size of about 6 to about 12 units.

4. The aqueous colorant dispersion of claim 3 wherein the A block has a block size of about 8 units.

5. The aqueous colorant dispersion of claim 1 wherein the B block has a block size of about 15 to about 80 units.

6. The aqueous colorant dispersion of claim 5 wherein the B block has a block size of about 25 to about 70 units.

7. The aqueous colorant dispersion of claim 1 wherein the polymeric dispersant has a number average Molecular Weight (Mn) in the range of between about 2,000 to about 20,000 daltons.

8. The aqueous colorant dispersion of claim 1 wherein n is about 1 to about 10.

9. The aqueous colorant dispersion of claim 1 wherein the polymeric dispersant has an acid number of about 40 to about 220 (mg KOH/g polymer solids).

10. The aqueous colorant dispersion of claim 9 wherein the polymeric dispersant has an acid number of about 50 to about 150 (mg KOH/g polymer solids).

11. The aqueous colorant dispersion of claim 1 wherein the A block monomer is selected from the group consisting of ethoxy triethylene glycol methacrylate, n-butoxyethyl methacrylate, and mixtures thereof.

12. The aqueous colorant dispersion of claim 1 wherein the B block comprises a hydrophobic monomer having the formula:

$$R_3R_4C\!\!=\!\!R_6X$$

wherein $R_3$-$R_5$ are independently selected from the group consisting of H, alkyl, aryl and alkylaryl of 1 to 20 carbon atoms, and
X is a hydrophobic group.

13. The aqueous colorant dispersion of claim 12 wherein X is selected from the group consisting of:
   (a) an alkyl, aryl and alkylaryl group containing 1-20 carbon atoms;
   (b) a group of the formula $C(O)OR_6$, wherein $R_6$ is selected from the group consisting of an alkyl, aryl and alkylaryl group containing 1-20 carbon atoms; and
   (c) a group of the formula $C(O)NR_7R_8$, wherein each of $R_7$ and $R_8$ is independently selected from the group consisting of H and an alkyl, aryl and alkylaryl group containing 1-20 carbon atoms.

14. The aqueous colorant dispersion of claim 13 wherein (a), (b) or (c) further comprises one or more heteroatoms.

15. The aqueous colorant dispersion of claim 13 wherein the hydrophobic monomer is selected from the group consisting of benzyl methacrylate, butyl methacrylate, methyl methacrylate, ethyl methacrylate, propyl methacrylate, hexyl methacrylate, 2-ethylhexyl methacrylate, octyl methacrylate, lauryl ethacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, acrylonitrile, glycidyl acrylate, p-tolyl acrylate, sorbyl acrylate, styrene, alpha-methyl styrene, substituted styrenes, N-alkyl acrylamides, N-alkyl methacrylamides, vinyl acetate, vinyl butyrate and vinyl benzoate.

16. The aqueous colorant dispersion of claim 1 wherein the ionic monomer has the formula:

$$R_9R_{10}C=R_{11}Z$$

wherein each of $R_9$-$R_{11}$ are independently selected from the group consisting of H and an alkyl, aryl or alkylaryl group having 1-20 carbons, and wherein Z is at least one ionic or a potentially ionic monomer.

17. The aqueous colorant dispersion of claim 16 wherein the Z group is anionic, cationic, amphoteric or zwitterionic.

18. The aqueous colorant dispersion of claim 17 wherein the Z group comprises an anionic group selected from the group consisting of sulfonates, sulfate, sulfosuccinate, carboxylate, and phosphate.

19. The aqueous colorant dispersion of claim 17 wherein the Z group comprises cationic group selected from the group consisting of an amine salt and a quaternary amine salt.

20. The aqueous colorant dispersion of claim 17 wherein the Z group comprises a zwitterionic group selected from the group consisting of betaine, +N—C—CO2-, and lecithin.

21. The aqueous colorant dispersion of claim 16 wherein the Z group is present as its hydrogen substituted form or as a salt.

22. The aqueous colorant dispersion of claim 16 wherein the Z group is selected from the group consisting of a methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate, vinyl pyrridine, N-vinyl pyrridine, and 2-acrylamido-2-propane sulfonic acid.

23. An aqueous ink jet ink comprising an ink vehicle and an aqueous colorant dispersion, wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

$$CH_2=CRC(O)O(CHR_1CH_2O)nR_2$$

wherein R and $R_1$ are H, or methyl;
   $R_2$ is alkyl of 1-4 carbon atoms or phenyl; and
   n is about 1 to about 20; and the B block is a segment comprising an ionic monomer and at least one hydrophobic monomer; and wherein the dispersant is neutralized.

24. A method of ink jet printing onto a substrate comprising, in any workable order, the steps of:
   (a) providing an ink jet printer that is responsive to digital data signals;
   (b) loading the printer with a substrate to be printed;
   (c) loading the printer with an aqueous ink jet ink comprising an ink vehicle and an aqueous colorant dispersion, wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% of a monomer, having the following formula:

$$CH_2=CRC(O)O(CHR1CH_2O)nR2$$

wherein R and R1 are H, or methyl;
   R2 is alkyl of 1-4 carbon atoms or phenyl; and
   n is about 1 to about 20; and
the B block is a segment comprising an ionic monomer and at least one hydrophobic monomer; and wherein the dispersant is neutralized; and
   (d) printing onto the substrate using the aqueous ink jet ink, in response to the digital data signals to form a printed image on the substrate.

25. A printer comprising an aqueous ink jet ink wherein the aqueous ink jet ink comprises an ink vehicle and an aqueous colorant dispersion, and wherein the aqueous colorant dispersion comprises a colorant and a polymeric dispersant, wherein the polymeric dispersant is a block copolymer comprising an A block and a B block, wherein the A block is a segment having a block size of about 5 to about 18 units, is substantially free of hydroxyethylmethacrylate, and comprises at least 50% by weight of a monomer, having the following structure:

$$CH_2=CRC(O)O(CHR_1CH_2O)nR_2$$

wherein R and $R_1$ are H, or methyl;
   $R_2$ is alkyl of 1-4 carbon atoms or phenyl; and
   n is about 1 to about 20; and
the B block is a segment comprising an ionic monomer and at least one hydrophobic monomer; and wherein the dispersant is neutralized.